INVENTOR:
KARL BERTHOLD ERNST ARNO HAUPTMANN

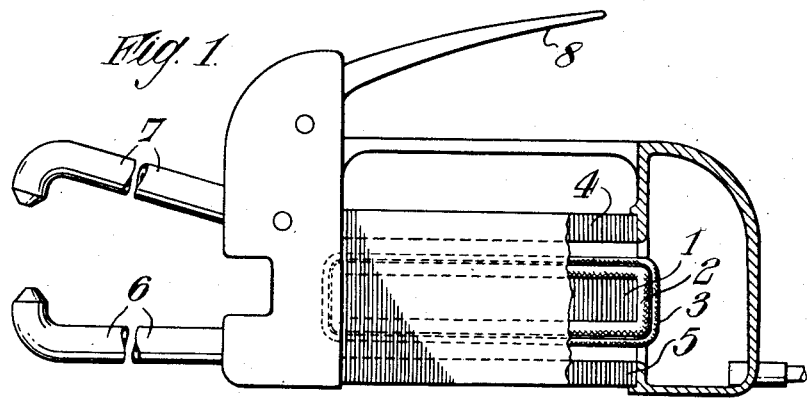
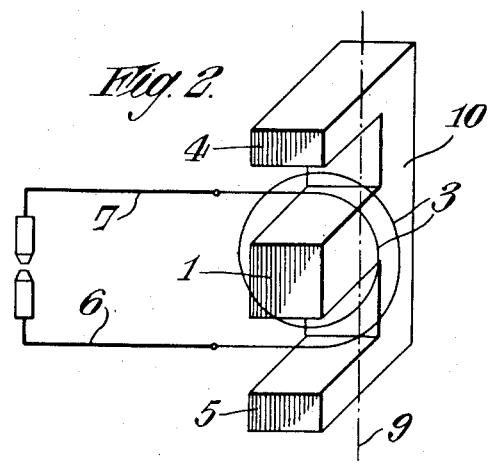
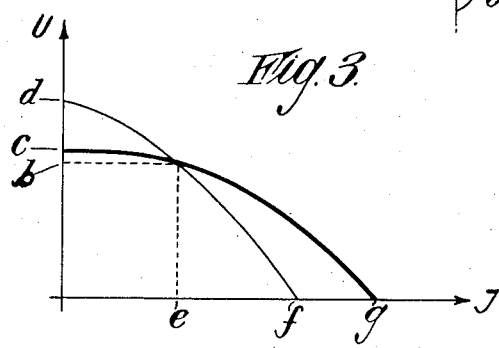

INVENTOR:
KARL BERTHOLD ERNST ARNO HAUPTMANN

United States Patent Office 2,922,026
Patented Jan. 19, 1960

---

2,922,026

SPOT-WELDING APPARATUS

Karl Berthold Ernst Arno Hauptmann, Hamburg-Othmarschen, Germany, assignor to Wilhelm Heine (trading as Heine Kommandit-Gesellschaft), Hamburg-Altona, Germany Application August 6, 1957, Serial No. 676,586

Claims priority, application Germany August 6, 1956

3 Claims. (Cl. 219—90)

This invention concerns spot-welding apparatus of the kind having tong-like welding electrode-arms mounted on a transformer to form a portable or hand-held unit which can draw electrical power through a suitable lead from a mains voltage source such as a socket outlet.

In practice, such apparatus needs to be of the lightest possible weight allied with the capacity to produce spot welds between pairs of sheets of up to about 14 S.W.G. or 1/12 inch thickness. Since the transformer accounts for most of the weight of the apparatus the design of this component is the most critical factor in achieving the minimum weight of the apparatus for a given welding capacity.

The power factor is a function of the ratio load/no-load voltage of the transformer secondary winding, the power factor improving as the ratio approaches unity; the no-load secondary voltage should, therefore, be as low as possible. The no-load secondary voltage is, however, dependent upon the number of secondary winding turns and the volts per turn ratio whilst the volts per turn ratio depends on the flux density and the cross-section of the core.

For a given welding capacity the volts per turn ratio can only be reduced by reducing the saturation. This leads to an increase in the weight of the transformer by requiring an increase in the core cross-section.

Thus for portable spot-welding apparatus of the kind with which this invention is concerned, any improvement in power factor, if a weight increase is to be avoided, can normally only be obtained in practice by a reduction in the number of secondary winding turns below the hitherto usual number of winding turns. Usually the secondary winding has two whole turns embracing the middle core leg of a three-legged shell-type core, although transformers are known in which the secondary winding proper comprises a copper cylinder embracing the middle core leg and having a longitudinal slit so that with the electrode-arms and their connections, a single turn winding is effectively produced.

Neither such a single turn winding nor the more usual two-turn winding gives the optimum arrangement and an object of the present invention is to provide spot-welding apparatus of the aforesaid kind which can achieve or closely approach the optimum transformer secondary winding arrangement.

In known transformers for spot-welding apparatus of the kind with which this invention is concerned, the secondary winding, including the part constituted by the electrode-arms and their connections with the winding proper, embraces only the flux in the middle leg of a three-legged shell-type core so that effectively the secondary winding is constituted by a whole number of turns embracing the total flux in the core. This results from the fact that the secondary winding proper extends only about the middle core leg and its terminations are both on the same side of the core, i.e. at one end of the greatest dimension of the transformer, and are directly connected to electrode-arms which extend substantially normally to the core laminations.

Therefore in known transformers the throat width of the tongs constituted by the electrode-arms is effectively the width of the transformer in the direction of the yokes. This has the disadvantage that only a narrow throat between the electrode-arms can be achieved giving rise to induction losses in the sheets being welded when the apparatus is used, or, if the electrode-arms are cranked to give a wider throat, the secondary circuit will be extended giving rise to resistance losses.

The present invention provides spot-welding apparatus comprising a transformer having a three-legged core, tong-like electrode-arms being carried by such transformer and constituting part of the secondary winding thereof, such secondary winding embracing the flux of the middle core leg and also the flux of one outer core leg thereby to have a non-integral number of total-flux turns.

With such an arrangement, if the two outer core legs are magnetically symmetrical the secondary winding will have an integral number plus a half total-flux turns, but it will be understood that by having magnetically asymmetrical outer core legs other effective non-integral values of total-flux turns may be achieved.

In accordance with a further feature of this invention, the electrode-arms preferably extend substantially parallel with the transformer core laminations when the core is formed by stacked laminations. If, however, the core is wound of hoop-iron the electrode-arms preferably extend substantially normally to the curl-axis of the core. In both cases the electrode-arms extend from points of the transformer which are separated by the greatest dimension of the latter, i.e. the core thickness perpendicular to the laminations or parallel to the curl axis. If the secondary winding proper embraces only the middle core leg but its terminations are brought out and connected to the electrode-arms on opposite sides of the core and the electrode-arms extend substantially parallel with the laminations, or normally to the curl-axis as the case may be, the electrode-arms will then embrace the flux in an outer leg and constitute a turn about such leg. Thus the present invention further provides spot-welding apparatus comprising a transformer having a three-legged core, the middle leg of which carries a secondary winding terminating on opposite sides of the core, such winding being connected to tong-like electrode-arms which extend from the secondary winding terminations in directions substantially parallel with the transformer laminations, or if the core is wound, normally to the curl-axis of the core.

Further features of the invention will appear from the following description and are defined in the appended claims. In order that the invention may be thoroughly understood and carried into practice reference is made to the accompanying drawings in which:

Figure 1 shows, partially in section, known spot-welding apparatus of the kind with which the present invention is concerned;

Figure 2 shows, schematically, the arrangement of the electro-magnetic components of the apparatus of Figure 1;

Figure 3 shows, in graphical form, the load characteristic of the transformer of the apparatus of Figures 1 and 2 in comparison with that of the transformer of an embodiment of the invention;

Figure 4:
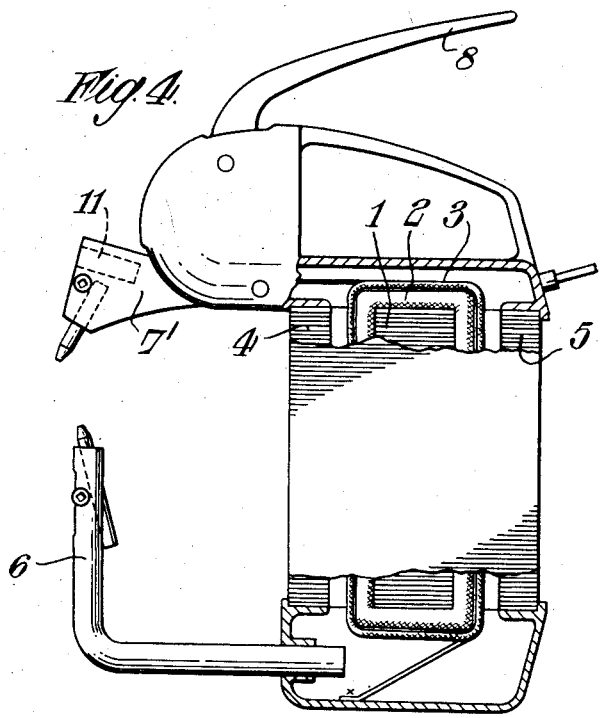
Figure 4 shows, partially in section, spot-welding apparatus in accordance with this invention.

Referring to the drawings, Figures 1 and 2 illustrate a known form of spot-welding apparatus of the kind with which this invention is concerned, the apparatus comprising a three-legged shell-type transformer having a middle core leg 1 carrying a primary winding 2 and a secondary winding 3, and outer core legs 4 and 5 which, with a pair of yokes complete the magnetic circuit of the middle leg 1. Tong-like electrode-arms 6 and 7 are carried by an end of the transformer, at least one of these, e.g. the upper electrode-arms 7, being movable to swing its extremity towards the other electrode-arms extremity by means of a pivoted lever 8 so that the electrode-arm extremities can be applied under pressure to the outer surfaces of two sheets (not shown) which are to be welded together in the area between the electrode-arm extremities by the passage of a heavy welding current between the electrodes.

As will be apparent from Figure 2, the electrode-arms 6 and 7 extend normally to the laminations of the transformer core and normally to the axes 9 of the core yokes 10 and complete an otherwise open turn of the secondary winding 3 of the transformer. The secondary winding thus effectively consists of two whole turns embracing the total flux which is produced by the primary winding 2 of the transformer.

The load characteristic of such an arrangement is represented in Figure 3 by the curve d—f which is a plot of electrode voltage U against electrode current J, the power being the product of the values of any pair of co-ordinates to the curve, for example b and e which are the co-ordinates of the design working load. The no-load or open-circuit electrode voltage is given by the point d and it will be noted that this is considerably above b, indicating the steepness of the curve d—f and a poor power factor. In Figure 3, the curve c—g is the load characteristic which can be achieved by apparatus in accordance with this invention and constructed as shown in Figures 4 and 5.

Figure 5:
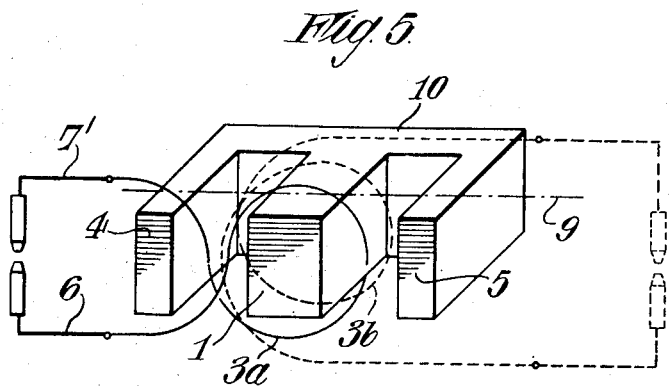
Figure 5 shows, schematically, two possible arrangements of the electro-magnetic components of the apparatus of Figure 4.

Thus in the apparatus shown in Figures 4 and 5, in which parts corresponding to parts of the apparatus of Figures 1 and 2 have been given the same reference numbers as in those figures, the electrode-arm 6 projects from one end of the transformer in a direction substantially parallel with the yoke axis 9 and parallel with the laminations whilst the other electrode-arm 7', projects from the other end of the transformer and also substantially parallel with the yoke axis 9 and the laminations.

In this embodiment, the terminations of the secondary winding 3 are brought out at opposite sides of the core, i.e. at the opposite ends of the transformer, to connect with the electrode-arms in the most convenient manner and since the electrode-arms straddle the outer core leg 4 there is a whole number of secondary winding turns embracing the middle core leg 1 and, effectively, a turn embracing the outer core leg 4. If the outer leg 4 carries half the flux of the middle leg 1, a single turn winding proper on the middle leg together with the said turn embracing the outer leg leads to a winding having effectively 1½ total-flux turns. One possible winding arrangement is shown by the full lines in Figure 5, the single turn secondary winding proper embracing the middle leg being designated 3a. An alternative arrangement is shown in broken lines in Figure 5, in which the electrode-arms and their connections with the single turn secondary winding proper, 3b, straddle an outer core leg 5 and also the middle core leg 1.

In the arrangement shown in full lines in Figure 5, the voltages induced in the secondary winding turn constituted by the electrode-arms and their connections with the single turn secondary winding proper are additive with respect to the voltages induced in the latter since although the turns are made in opposite directions about the respective core legs, the fluxes in the two legs are oppositely directed. In the arrangement shown in broken lines in Figure 5, the electrode-arms and their connections constitute a second turn of the winding which embraces the middle core leg so that the latter effectively carries two secondary turns, and they also constitute a turn about an outer core leg, the flux in which induces voltages opposed to that in the secondary winding proper. Thus the voltages induced in the turn constituted by the electrode-arms and their connections are equivalent to half a turn on the middle core leg additional to the winding proper.

Comparison of Figures 1 and 4 shows the increased electrode-arm throat width that can be obtained with the arrangement of this invention without the need for special electrode-carrying structures to space the electrode-arms from the transformer core or the use of cranked electrode-arms.

It will be noted that in the embodiment of Figure 4 the electrode-arms are detachably mounted on the transformer at locations which are staggered in relation to the lengths of the electrode-arms, the lower electrode-arm 6 being of greater length than the upper electrode-arm 7' which is in the form of a double bit clamp. If a deeper throat than that given by the arrangement depicted is required, the lower electrode-arm can be detached and inserted into the upper socket 11 of the upper electrode-arm clamp to form an extension of the upper electrode-arm, and a longer electrode-arm used as the lower electrode-arm. Thus only a single additional electrode-arm is required to provide two depths of throat.

The windings proper of the transformer of apparatus in accordance with this invention may be constructed in the known manner; however an improvement in coupling coefficient, i.e. an improvement of the power factor and the transformer capacity, can be achieved by the use of a secondary winding in the form of a tube, e.g. cast in copper and shaped to embrace the desired core leg, such tube being slotted to constitute a coil of 1½ or more turns with integral connecting ears at opposite sides and which has integral peripheral flanges at least at its ends so that it constitutes a former about which the primary winding may be wound. In axial section, such a secondary winding would conform in shape to a channel, or to an L and its mirror image, or to an E or a comb, depending upon the presence or absence of intermediate peripheral flanges.

Figure 6A:
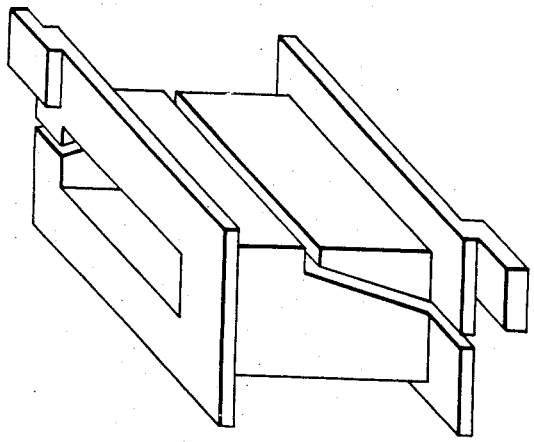
Figures 6a and 6b show, in perspective view and axial section, respectively, one form of secondary winding for the transformer of spot-welding apparatus.
Figure 6B:
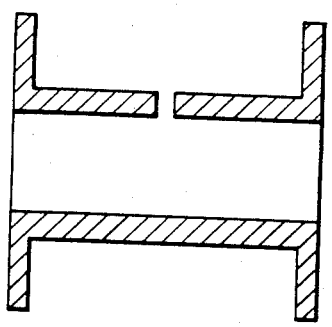

Figures 6a and 6b illustrate a 1½ turn coil having only end flanges; as shown in Figure 6b, the upper half of the axial section is an L and its mirror image owing to the transverse slot in such half, whilst the lower half is of (inverted) channel section.

Figure 7A:
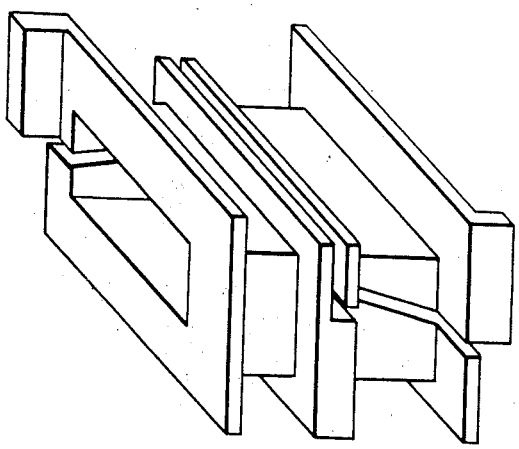
Figures 7a and 7b show a further form of secondary winding.
Figure 7B:
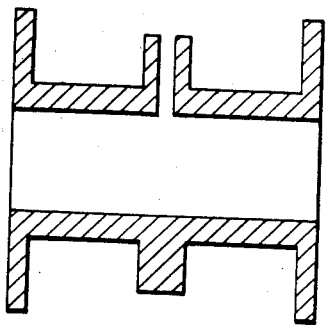

Figures 7a and 7b illustrate a second form of 1½ turn coil having an intermediate flange to divide the primary winding wound about the coil into two axially separated sections, this intermediate flange being divided by the transverse slot across the upper half of the tube constituting the coil; in axial section the upper half appears as laterally separated channel sections whilst the lower half has an E section.

With such forms of secondary winding, because the primary winding is located in the spaces between the peripheral flanges it is effectively embedded in the seconary winding and a coupling coefficient of unity is substantially achieved in spite of the large primary/secondary turns ratio and the low number of secondary winding turns.

What I claim is:

1. Spot-welding apparatus comprising a transformer having a three-legged core including a middle leg and two outer legs, a primary winding on said middle leg, a secondary winding, tong-like electrode arms carried by said transformer and constituting part of said secondary winding, said secondary winding linking the flux of said middle core leg with at least one integral turn and also the flux of one of said outer core legs to provide a total non-integral number of linking turns with respect to the flux in said middle core leg.

2. Spot-welding apparatus comprising a transformer having a three-legged core including a middle leg and two outer legs, the axes of said three legs being substantially coplanar, a primary winding and a secondary winding on said middle core leg, tong-like electrode arms carried by said transformer and straddling an outer leg of said core, said arms being connected to said secondary winding at points located on opposite sides of the plane of said axes so that said secondary winding is formed of an integral number of turns linking the flux of said middle core leg, said electrode arms forming an additional secondary turn linking the flux in the outer leg which is straddled by said arms to provide a winding for energizing said electrode arms which includes a non-integral total number of turns with respect to the flux in said middle core leg.

3. Spot-welding apparatus comprising a transformer having a substantially flat three-legged core, a primary winding and a secondary winding carried by the middle leg of said core, terminals for said secondary winding on opposite sides of the plane containing the axes of said core legs, tong-like electrode arms carried by said transformer and extending from said secondary winding terminations in directions substantially parallel with the laminations of said core to embrace the flux of an outer core leg.

References Cited in the file of this patent

UNITED STATES PATENTS

| | | |
|---|---|---|
| 1,480,857 | Flood | Jan. 15, 1924 |
| 1,506,698 | Waters | Aug. 26, 1924 |